(12) United States Patent
Rector et al.

(10) Patent No.: US 9,262,298 B2
(45) Date of Patent: Feb. 16, 2016

(54) DEBUGGING OBJECT ABSTRACTIONS

(75) Inventors: Brent Eugene Rector, Redmond, WA (US); Jackson Michael Davis, Bothell, WA (US); Saji Abraham, Kirkland, WA (US); Lin Xu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 107 days.

(21) Appl. No.: 13/398,034

(22) Filed: Feb. 16, 2012

(65) Prior Publication Data
US 2013/0219369 A1    Aug. 22, 2013

(51) Int. Cl.
*G06F 9/44*     (2006.01)
*G06F 11/36*    (2006.01)

(52) U.S. Cl.
CPC ................... *G06F 11/362* (2013.01)

(58) Field of Classification Search
CPC   G06F 11/362; G06F 11/3664; G06F 11/3688
USPC .................................................. 717/125, 127
See application file for complete search history.

(56) References Cited

U.S. PATENT DOCUMENTS

| | | | |
|---|---|---|---|
| 5,481,721 A | 1/1996 | Serlet et al. | |
| 2004/0193388 A1* | 9/2004 | Outhred et al. | 703/1 |
| 2005/0086644 A1 | 4/2005 | Chkodrov et al. | |
| 2005/0097399 A1* | 5/2005 | Bliss | G06F 11/3624 714/38.11 |
| 2005/0246688 A1* | 11/2005 | Gupta | G06F 11/3636 717/124 |
| 2006/0080639 A1* | 4/2006 | Bustelo | G06F 8/20 717/111 |
| 2010/0162212 A1* | 6/2010 | Stall et al. | 717/124 |
| 2012/0102456 A1* | 4/2012 | Paulheim et al. | 717/116 |

OTHER PUBLICATIONS

Ngo, Debugging by Remote Reflection, Jul. 2000, p. 1032-1038.*
Beulke, Java DB2 Performance with Data Studio and pureQuery, Jun. 2009, p. 1-31.*
"CLR Debugging Overview", Retrieved at <<http://msdn.microsoft.com/en-us/library/bb397953.aspx>>, Retrieved Date: Nov. 24, 2011, pp. 9.
Wurthinger, et al., "Multi-Level Virtual Machine Debugging using the Java Platform Debugger Architecture", Retrieved at <<http://www.ssw.uni-linz.ac.at/General/Staff/TW/WuerthingerPSI09.pdf>>, Retrieved Date: Nov. 24, 2011, pp. 12.

(Continued)

*Primary Examiner* — Duy Khuong Nguyen
(74) *Attorney, Agent, or Firm* — Timothy Churna; Judy Yee; Micky Minhas

(57) ABSTRACT

The claimed subject matter provides for systems and/or methods for debugging a computer-executable file. The computer-executable file may be executing in a first runtime environment and located in a first process. The file may further comprise on object having a proxy in that first runtime environment. One method embodiment comprises the steps of debugging said computer-executable file; detecting a proxy for an object called by said file; decoding said proxy to obtain physical information regarding said object; returning said physical object information; and transforming said physical object information into logical object information. In addition, one embodiment of a system is provided that comprising a debugger, said debugger debugging client code; a proxy decoder, said proxy decoder providing information to said debugger about the object pointed by said proxy; and an abstraction transformation, said abstraction transformation transforming physical expressions of a proxy into higher level logical expressions.

19 Claims, 4 Drawing Sheets

(56) References Cited

OTHER PUBLICATIONS

Russell, Kenneth B., "The HotSpot™ Serviceability Agent: An Out-of-Process High Level Debugger for a Java™ Virtual Machine", Retrieved at <<http://www.usenix.org/event/jvm01/full_papers/russell/russell_html/>>, Retrieved Date: Nov. 24, 2011, pp. 8.

"Abstraction-Based Debugging", Retrieved at <<http://www-csag.ucsd.edu/projects/concert/debugger/section3_7.html>>, Retrieved Date: Nov. 24, 2011, pp. 2.

Keremitsis, et al., "HP Distributed Smalltalk: A Tool for Developing Distributed Applications", Retrieved at <<http://www.hpl.hp.com/hpjournal/95apr/apr95a11.pdf>>, Hewlett-Packard Journal, Apr. 1995, pp. 8.

* cited by examiner

US 9,262,298 B2

DEBUGGING OBJECT ABSTRACTIONS

BACKGROUND

Modern software runtime environments create abstractions when implementing Application Programming Interfaces (APIs). Such abstractions hide the complexity of the system and provide a logical view of the system to the user.

Debugging objects in such modern software runtime environments presents a challenge—as debugging such objects typically executes the code within the context of the application being debugged. As a result, debugging objects in an environment potentially changes the environment.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Some embodiments of the present application provide for systems and/or methods for debugging a computer-executable file. The computer-executable file may be executing in a first runtime environment and located in a first process. The file may further comprise on object having a proxy in that first runtime environment.

One method embodiment comprises the steps of debugging said computer-executable file; detecting a proxy for an object called by said file; decoding said proxy to obtain physical information regarding said object; returning said physical object information; and optionally transforming said physical object information into logical object information.

In addition, one embodiment of a system is provided that comprising a debugger, said debugger debugging client code; a proxy decoder, said proxy decoder providing information to said debugger about the object pointed by said proxy; and an optional abstraction transformation, said abstraction transformation transforming physical expressions of a proxy into higher level logical expressions.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
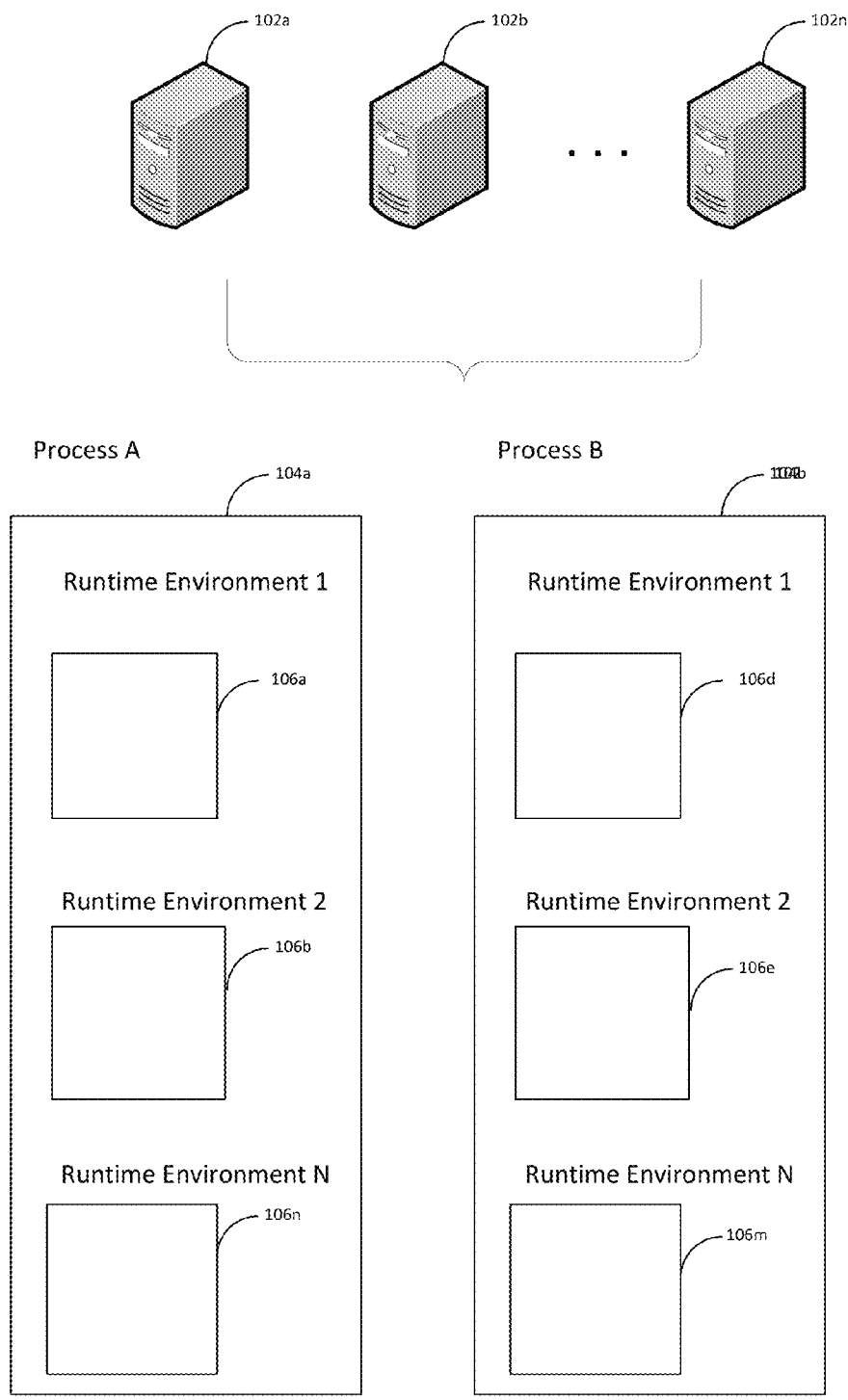
FIG. 1 illustrates the complexity of modern software environments comprising multiple computing platforms, processes and runtime environments.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

It is common practice for software runtime environments to create abstractions over the implementation of the application programming interface (API) provided by that runtime. These abstractions provide the public surface area of the underlying systems implementation. Such abstractions exist to: (1) hide the complexities of the system to consumer software; (2) allow the implementation of a system to vary from the public surface area and (3) provide a more logical view of the system itself.

These abstractions are created using software interfaces that contain functions or methods to be called from client software code to invoke operations on the system. Software interfaces may also provide access to "properties" that describe the current state of the system. Often times, these properties are implemented using special functions that can get and set desired values. Sometimes, these properties are backed by a simple data field but need not be. For runtime systems that use a function-based model, the properties may be implemented using arbitrarily complex software code.

Viewing the values of these properties of the system, as exposed through the abstractions provided by the API, is one aspect to developing software running in such an environment. Traditionally, debugging objects using a property-based system meant actually executing the underlying property getter code. This approach to debugging is usually called "function evaluation", or "func-eval". Because the actual code implementing the property is executed within the context of the application being debugged, this approach may not be desirable for several reasons: (1) since the debugger is injecting calls into the "debuggee" (i.e., the process, code and/or application being debugged) process at random points within the execution of the debuggee process, the system or debuggee may not be able to execute the call to the property getter. Therefore, values of properties may not be visible in the debugger, or inspecting them may result in debuggee corruption; (2) if the system contains objects that depend on more threads than the one being inspected, func-eval based inspection may not work. For instance, if the property being evaluated has affinity to a specific thread and is inspected from the wrong thread, inspecting that property can lead to deadlocks or debuggee corruption; (3) any side effects in the implementation of the property getter may persist in the application; (4) constraints of the runtime environment may have to be violated in order to make the call to the property getter. For instance, exception unwind information may be incorrect at the time the call is made; and (5) the debuggee process should be in a good enough state to actually evaluate the property getter. For instance, if the debuggee process is near an out-of-memory condition, or is corrupt enough that threads do not run, debugging the system becomes difficult.

Conventional debuggers read values directly from the debuggee application. However, the debuggee may call objects that are not in the debuggee's process. In general, an out-of-process object refers to an object (and/or an application) that is called or caused to run by a host object in one process; but that runs in a memory space that is different from a host object and its process. The debuggee may contain "proxies" (e.g., an interface) that point to objects that are out-of-process to the debuggee.

In one embodiment, native code debuggers have depended on another model for inspecting debuggee state: out-of-process inspection—e.g., wherein the debuggee is out-of-process to the debugger. When the debuggee is out-of-process to the debugger, data values that represent the state of the application are read out of the debuggee process memory without executing code within the debuggee process. This model may increase the reliability of inspecting debuggee process state because obtaining the values may not depend on executing code within the debuggee process at random points. This model may be desirable as: evaluation may not depend on the stability of the debuggee, side-effects of evaluations may not persist, debuggees may not be corrupted by the debugger, and offline (dump) scenarios may work.

However, the out-of-process inspection model may have several areas for improvement: (1) the abstractions created in the public API (specifically properties) may be lost. Thus, the end-developer debugging code running on such a runtime may have to understand enough of the implementation details of the platform to mentally rebuild the abstraction from the underlying raw data; (2) such rebuilding of the abstraction may not be possible if the value is calculated when the property is called or no underlying data exists; and (3) distributed objects running in another software context or process, may be opaque to the debugger. One example of such opaqueness is proxy objects and/or interfaces that stand in for real implementations; but route calls across a protocol to another process.

One Embodiment

One embodiment of a debugger made in accordance with this present application may comprise a debugging methodology of an application on a system using a property-getter model where such property-getter model may use the out-of-process inspection of objects avoiding the limitations of the func-eval model—while allowing the platform's original abstraction to be accurately modeled, as well as removing the opaqueness of proxied objects being inspected in such a system.

To give perspective, FIG. 1 depicts one aspect to the complexity of the modern software runtime environments. Multiple processes—e.g., Process A (104*a*) and Process B (104*b*)—may be executing on one or more computing processors—e.g., 102*a*, 102*b*, . . . , 102*n*. Each of these computing processors may be in communication with a subset of each other—either directly or indirectly. Each process—such as Process A—may comprise a number of runtime environments (106*a* through 106*n*). Each such runtime environment may be executing on a number of processors. Each of these runtime environments may comprise client code or other objects, such as proxies, as described further herein. These and other objects should be effectively tracked by any debugger called to debug client code.

Figure 2:
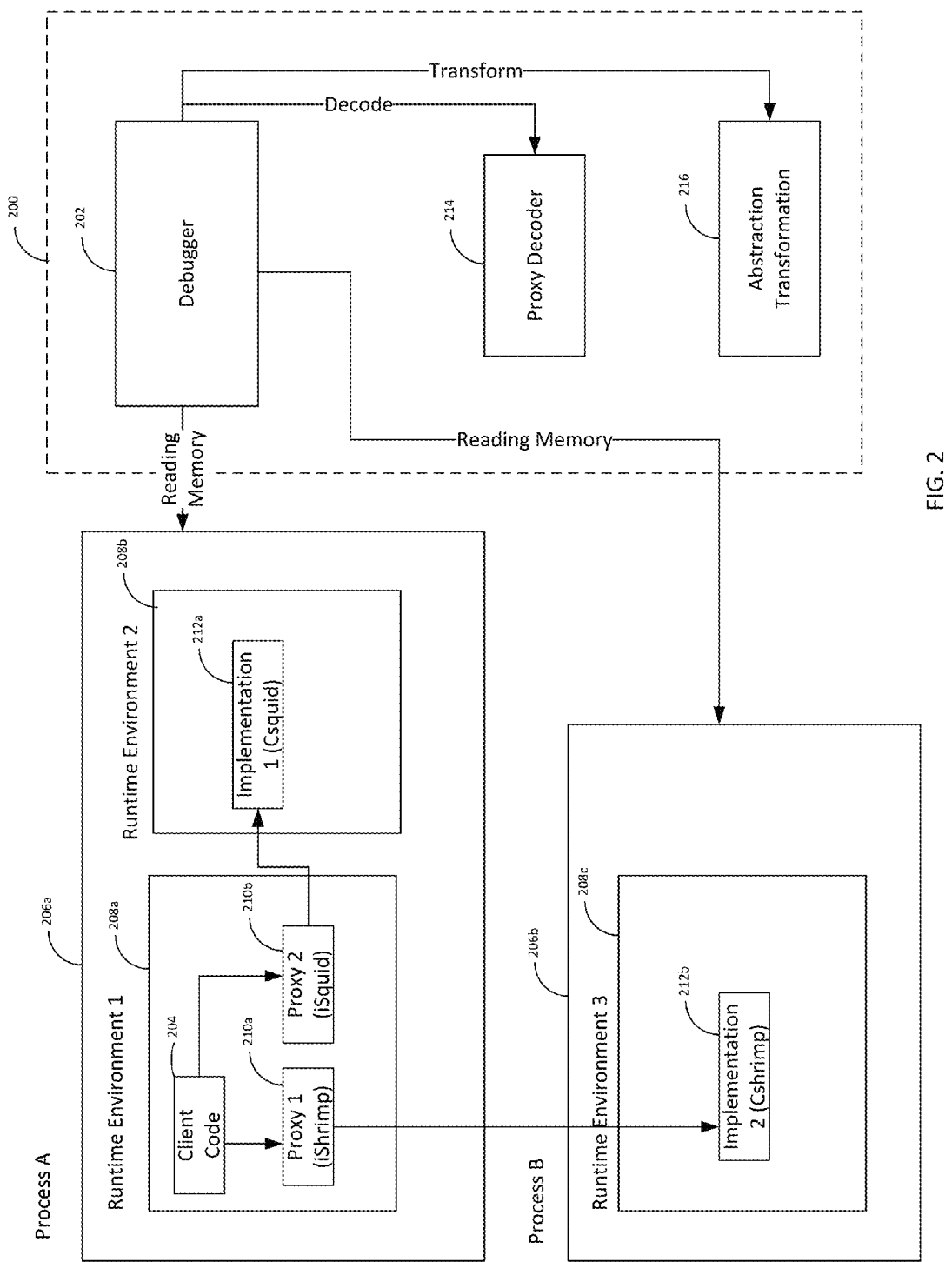
FIG. 2 is one embodiment of a debugger, made in accordance with the present application, debugging an exemplary client code.

FIG. 2 gives one exemplary embodiment of a debugger made in accordance with the present application that is called upon to debug client code 204. Client code 204 may be running as part of Process A (206*a*) and within a first runtime environment 208*a*. To add to the complexity, client code 204 may employ proxies, as will be discussed further below.

Debugger Embodiment

One embodiment of a debugger (200) may employ a debugger-object inspection model based on out-of-process inspection. Debugger 200 of the present application may comprise a debugger 202 (perhaps a native code debugger, a managed debugger, a script debugger or any other suitable debugger); an optional abstraction transformations 216 and proxy decoder 214. Debugger 202 reads memory for values during the course of its debugging the client code. During the course of debugging, debugger 202 may detect that objects are referenced by the client code that may be in a second (i.e. different) runtime environment than the first runtime environment (but possibly in the same process) that contains the client code. At other times, debugger 202 may detect that objects are referenced that are not only in a different runtime environment—but may also be out-of-process to the client code. Occasionally, these object references may comprise calls to proxies for implementations that are in a different runtime environment than—and possibly, out-of-process to—the client code.

Abstraction transformation 216 may optionally be called and used to convert the raw fields of objects within the system into a logical higher level view of the public abstractions provided by that system. Proxy Decoder 214 may affect a method and/or mechanism of decoding opaque proxies to objects running within another software context—such as apartment or process. In addition, it may be desired that the debugger display decoded proxy objects within the context of the proxy itself—again perhaps using an out-of-process based debugger inspection model.

Object Abstractions

Out-of-process debugger inspection of an object uses the ability of a debugger to directly read the underlying data for an object out of debuggee memory. The debugger finds the object in question using the state of the debuggee process and the "debug information" for the type. An example of such debug information is the Program Database file (PDB) created by current compilers. The PDB defines (among other things) the physical structure of the layout of memory for a class as well as source code names for each piece of data contained within the class. However, in practice, the actual data fields backing the object often do not match up with the properties from the public abstraction of a class. Therefore, the developer should understand the details of the object in order to transform the implementation of the object into the logical view. In one embodiment, the debugger may perform an extra step before presenting the view of a property getter based object to the end developer. This transformation uses information provided by the developer that created the object, to transform the physical view of the object into the logical view.

Figure 4:
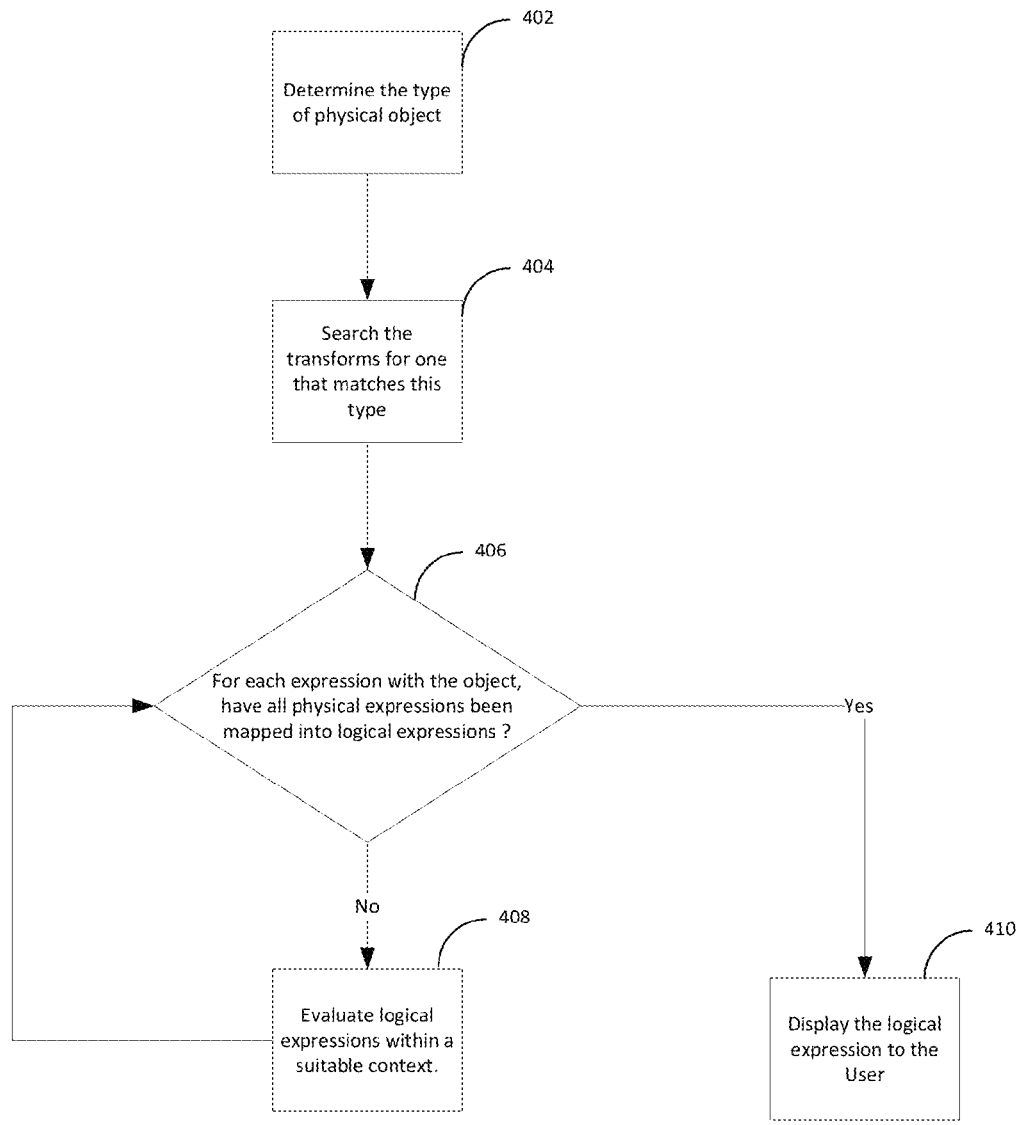
FIG. 4 is one embodiment of an optional abstraction transformation made in accordance with the principles of the present application.

FIG. 4 depicts one embodiment of the transformation made in accordance with the principles of the present application. The abstraction transformation may implement the means for mapping physical transformations into logical transformations as follows:

At step 402, the type of the physical object is determined from the debug information. The debugger searches the transforms for one that matches this type taking version information of the type into account at step 404. In one implementation of this algorithm, the transformations may be contained within a separate file from the debug information or the debuggee binaries, but it should be appreciated that the transformations may be stored in a variety of known manners.

At step 406, the system checks to see that for each expression contained within the object being viewed, that each physical expression has been mapped into a logical expression. Transformations exist that inform the debugger how to perform the mapping from physical expression into to a logical expression. These transforms may contain very complex debugger expressions.

The logical expressions should be evaluated by the debugger within the context of the debuggee at 408 and the object being inspected using out-of-process inspection. The logical view of the expression is displayed to the end user of the debugging process and/or system at 410. In addition, the debugger may also choose to expose the physical view of the object to the user as well.

Transformation Example

A simple example of the transformation is as follows. Assume a developer has architected an interface ISquid that contains a single property getter "Length". Now, assume the concrete implementation of ISquid::Length is calculated by obtaining the sub-lengths of the various pieces of the squid. For instance, it would return the length of the tentacles plus the length of the body, plus the length of the fin that sits on top of a squid's head. In C++, the definition of Length might look like this:

```
class CSquid : public ISquid
{
   private: int m_tenticleLen, int m_bodyLength, int m_finLength;
   int Length( ) { return m_tenticleLen + m_bodyLength + m_finLength; }
};
```

In a typical out-of-process debugger, the end developer would see a view of a CSquid that looks something like this:

```
            - squid
              m_tenticleLen : 3
              m_bodyLength : 4
              m_finLength : 5
```

The end developer would understand the implementation of the length property well enough to know that the total length is these three values added together. While this is an easy example, this becomes much harder when the end developer is missing information about the implementation of CSquid because the developer lacks source code for it—as is often the case when debugging code owned by an operating system or third party library. Furthermore, as is often the case, the abstraction laid out may not be anything like the actual physical implementation.

Continuing with this example, the debugger transformation for CSquid would map a logical view of the Length property so the user would see this:

```
            - squid
              Length : 12 (logical length rebuilt using transformation)
              Physical View
                 m_tenticleLen : 3
                 m_bodyLength : 4
                 m_finLength : 5
```

As concrete example, the transformation provided by the debugger might look like this:

```
CSquid - seafood.dll version 2.3.4-3.0
"Length" = this.m_tenticleLen + this.m_bodyLength + this.m_finLength
```

The debugger might interpret this as: "Any time a type named CSquid from seafood.dll version 2.3.4 until version 3.0, is encountered by the debugger, show a property named "Length" whose value is calculated by evaluating the three sub values". Thus, the public abstraction may now be visible in the debugger.

Distributed Object Inspection

In continued reference to FIG. 2, it is common for objects to span multiple runtime environments within the same process or in multiple processes or even across machine boundaries. In such environments, objects from a different runtime environment may be represented by "Proxies" (e.g. 210a, 210b) to client code (204) rather than clients having direct access to the objects or protocols themselves. Concrete examples of runtime environments that make use of the proxy model are cross apartment objects in Microsoft's Component Object Model (COM) or .Net Remoting. It should be noted that the client object and server objects may be "logically" separated for some purpose such as thread affinity. A boundary such as a process or machine transition may not exist for this model to be in use. Proxies abstract out the underlying transport mechanism of the runtime transition. Their public interfaces may look substantially identical to the real object but the implementation of the methods route calls across a protocol to the actual implementation object. The protocol may route calls to objects across different "runtime environments" within the same process, to objects in different processes on the same machine, or to objects running on another machine.

In an out-of-process debugger model, proxied objects may be opaque to the end developer. The developer may often only see the shape of the public abstraction but may not see any details of the underlying objects. If a func-eval is performed to see such details, such func-eval may be potentially corrupting when actually executed in the context of the debuggee process. In one embodiment of this application these traditionally opaque objects may be unwrapped and displayed to the end developer without the need for func-eval.

The protocol used to route calls from proxy to implementation should contain target information about the object being called. In the case of an intra-process cross-runtime environment call or cross process call, such target information may comprise: (1) the runtime environment or pointer to the concrete object on target side, and (2) the process that the target object resides in. The proxy object may maintain either contain this information directly, or obtain it from the system using some unique identifier for the proxy/implementation pair. If the underlying runtime can decode this information using a proxy pointer, the debugger may obtain the physical view of the implementation object from the target runtime environment or process and display that to the end-developer. Furthermore, the abstracted view of the implementation may then be re-created using the transformation model described above. The end-result of such an embodiment is that previously opaque objects may be easily diagnosable without the need for corrupting func-evals.

Continuing on with the example from FIG. 2, assume the client for the ISquid interface and the implementation of CSquid live in different logical runtime environments (e.g. 208a and 208b respectively) within the same process. When a developer looks at a proxy to ISquid in the debugger, all that may be seen is the object's v-table. This is because the proxy does not contain any real data. The v-table is not very useful for diagnosing issues. ISquid proxy view in typical debugger may look like:

```
pSquid - ISquid
    v-table
        Length (function pointer to function that routes calls across
        network, not real length value)
```

When a debugger and runtime support the decoding model, the debugger can ask the runtime to decode the proxy pointer and return the suitable information to find the concrete object. The debugger may then use typical type information contained within the debug information to construct a physical view of the object. In this example, this might look like this in the debugger:

```
pSquid - proxy to CSquid
    VTable
        v-table
            Length (function pointer to function that routes calls
            across network, not real length value)
    Proxied Implementation Object (processid:676, threadid:300)
        CSquid - 0x12345678 (address of physical squid)
            m_tenticleLen : 3
            m_bodyLength : 4
            m_finLength : 5
```

This may be a desirable view of the ISquid proxy. The end developer may now see the actual physical backing state behind the object that the pSquid proxy represents.

Next, the debugger may apply a logical transformation to the CSquid implementation object in order to show the view of the abstraction as described above. One embodiment might look like this in a debugger:

```
pSquid - proxy to CSquid
    VTable
        v-table
            Length (function pointer to function that routes calls
            across network, not real length value)
    Proxied Implementation Object (processid:676, threadid:300)
        CSquid - 0x12345678 (address of physical squid)
            Length : 12 (logical Length property rebuilt using
            transformation)
                Physical View
                    m_tenticleLen : 3
                    m_bodyLength : 4
                    m_finLength : 5
```

The end developer may now have the complete view of the implementation backing the pSquid proxy while being able to see the value of the public abstraction as well as the physical values.

Figure 3:
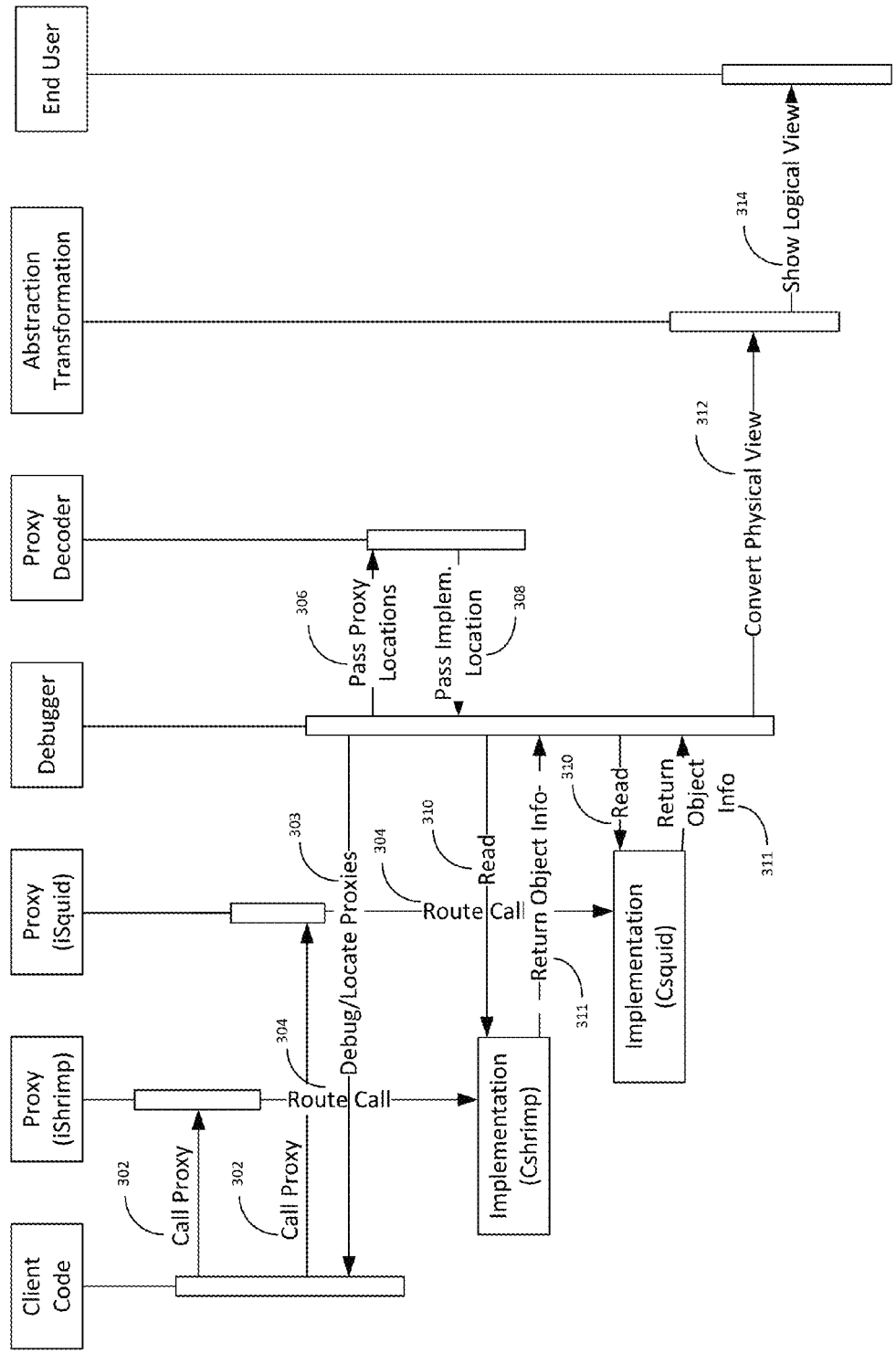
FIG. 3 illustrates one embodiment of a debugging process made to debug the client code as illustrated in FIG. 2.

FIG. 3 illustrates one embodiment of a process flowchart applicable to the example shown in continued reference to FIG. 2. At runtime, the client code 204 running within runtime environment 1 calls proxies (302) for two objects: CSquid 201a and CShrimp 210b. CSquid lives within the same process 208a as the client code but in a different logical runtime environment 208b. CShrimp lives within another process 206b, perhaps running on the same machine.

At the time the proxies are created, each proxy/object pair may be registered with the centralized proxy manager service. Each call from client code to proxy is routed across a channel to the correct implementation (304). When the end developer debugs (303) the client code, the debugger 202 may see, detect and/or locate Proxy 1 (210a) and Proxy 2 (210b) that may be called by the client code. In one embodiment, debugger 202 may comprise a native code debugger and a proxy decoder that translates the location of a proxy to the location of its implementations. Once the debugger detects and/or locates a proxy in client code in the course of debugging, the proxy decoder is called to make such a translation.

The debugger 202 may pass proxy locations to the Proxy Decoder 214 at 306 to pass the locations of the implementations for the proxies (at 308) and, in one embodiment, return a suitable set of information—e.g., the thread id, process id, and implementation object of the object. The debugger may use that information to read memory data (at 310) within the correct context of the object to obtain and/or return the physical view of the implementation objects (at 311). The debugger consults the abstraction transformations (at 312) to convert the physical view of the implementation objects into logical views. The logical (and possible physical) views of the implementation object are displayed to the end developer in the debugger along with the proxy at 314.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A method for debugging a computer-executable file, said file executing in a first runtime environment located in a first process and said file further comprising at least one reference to an object, said object being referenced executing in a second runtime environment, and further wherein said object comprising one of a plurality of types, the steps of said method comprising:

debugging said computer-executable file, said file executing in a first runtime environment;

detecting a reference for an object called by said file, said object executing in a second runtime environment;

decoding said reference to obtain physical information regarding said object;

returning said physical object information;
determining the type of physical object;
transforming said physical object information into logical object information that matches the type of physical object, said logical object information comprising an abstraction of said physical object information; and
unwrapping and displaying said logical object information to an end user of the debugging process without corrupting said object by avoiding functional evaluation on said object.

2. The method of claim 1 wherein the step of debugging said computer-executable file comprises debugging said computer-executable file with a debugger, said debugger comprising one of a group, said group comprising: native code debugger, managed debugger, script debugger and debugger.

3. The method of claim 1 wherein said steps of detecting a reference and decoding said reference further comprises:
detecting a proxy for an object that is running in a second runtime environment; and
decoding said proxy to obtain physical information regarding said object.

4. The method of claim 3 wherein said object running in said second runtime environment is running in said first process.

5. The method of claim 3 wherein said object running in said second runtime environment is running in a second process, said second process being out-of-process to said first process.

6. The method of claim 3 wherein said step of decoding said proxy comprises returning a first set of location information about said object.

7. The method of claim 6 wherein the step of decoding said proxy information further comprises reading memory data within the context of said object.

8. The method of claim 3 wherein the step of decoding said proxy information further comprises decoding opaque proxies to objects running within another context wherein said context comprises one of a group, said group comprising: an apartment or a process.

9. The method of claim 1 wherein the step of transforming said physical object information into logical object information further comprises converting raw fields of said object into a higher level logical view.

10. One or more computer-readable storage memory comprising executable instructions to perform a method, the method comprising:
debugging a computer-executable file, said file executing in a first runtime environment;
detecting a proxy for an object, said object being referenced executing in a second runtime environment, and further wherein said object comprising one of a plurality of types, called by said file;
decoding said proxy to obtain physical information regarding said object;
returning said physical object information;
determining the type of physical object;
transforming said physical object information into logical object information that matches the type of physical object, said logical object information comprising an abstraction of said physical object information; and
unwrapping and displaying said logical object information to an end user of the debugging process without corrupting said object by avoiding functional evaluation on said object.

11. The one or more computer-readable storage memory of claim 10 wherein the step of debugging said computer-executable file comprises debugging said computer-executable file with a native code debugger.

12. The one or more computer-readable storage memory of claim 10 wherein said step of detecting a proxy further comprises the step of detecting a proxy for an object that is running in a second runtime environment.

13. The one or more computer-readable storage memory of claim 12 wherein said object running in said second runtime environment is running in said first process.

14. The one or more computer-readable storage memory of claim 12 wherein said object running in said second runtime environment is running in a second process, said second process being out-of-process to said first process.

15. The one or more computer-readable storage memory of claim 10 wherein the step of decoding said proxy information further comprises decoding opaque proxies to objects running within another context wherein said context comprises one of a group, said group comprising: an apartment or a process.

16. The one or more computer-readable storage memory of claim 10 wherein the step of transforming said physical object information into logical object information further comprises converting raw fields of said object into a higher level logical view.

17. A system for debugging an computer-executable file, said file executing in a first runtime environment located in a first process and said file further comprising at least one object, said object comprising a proxy in said first runtime environment, said system comprising:
a processor;
a computer readable memory, said memory comprising computer readable instructions, when said instructions are read by said processor, causes said processor to create the following:
a debugger, said debugger debugging client code;
a proxy decoder, said proxy decoder providing information to said debugger about the object pointed by said proxy, said object being referenced executing in a second runtime environment, and further wherein said object comprising one of a plurality of types;
an abstraction transformation, said abstraction transformation transforming physical expressions of a proxy into higher level logical expressions wherein further said logical object information comprising an abstraction of said physical object information that matches the type of physical object; and
further wherein said proxy decoder unwrapping and displaying said logical object information to an end user of the debugging process without corrupting said object by avoiding functional evaluation on said object.

18. The system of claim 17 wherein said debugger comprises a debugger and a proxy detector.

19. The system of claim 17 wherein said abstraction transformation comprises mapping physical expressions into logical expressions.

* * * * *